United States Patent
Kolagi et al.

(10) Patent No.: US 10,467,401 B2
(45) Date of Patent: Nov. 5, 2019

(54) METHOD AND SYSTEM FOR DEVICE AUTHENTICATION

(71) Applicant: SONY CORPORATION, Tokyo (JP)

(72) Inventors: Vinayak Kolagi, Bangalore (IN); Vittal K. Biradar, Bangalore (IN)

(73) Assignee: SONY CORPORATION, Tokyo (JP)

( * ) Notice: Subject to any disclaimer, the term of this patent is extended or adjusted under 35 U.S.C. 154(b) by 469 days.

(21) Appl. No.: 14/252,496

(22) Filed: Apr. 14, 2014

(65) Prior Publication Data

US 2015/0294104 A1    Oct. 15, 2015

(51) Int. Cl.
*G06F 21/44* (2013.01)
*G06F 3/0481* (2013.01)
*G06F 3/01* (2006.01)
*G06F 21/31* (2013.01)
*G06F 3/0484* (2013.01)

(52) U.S. Cl.
CPC .............. *G06F 21/44* (2013.01); *G06F 3/016* (2013.01); *G06F 3/017* (2013.01); *G06F 3/04817* (2013.01); *G06F 3/04842* (2013.01); *G06F 21/31* (2013.01); *G06F 2203/04105* (2013.01); *G06F 2221/2129* (2013.01)

(58) Field of Classification Search
CPC .......... G06F 21/34; G06F 21/31; G06F 21/32; G06F 21/36; G06F 3/016; G06F 21/22; G06F 3/041; G06F 3/0488; G08B 6/00; H04W 12/06; H04W 12/08
See application file for complete search history.

(56) References Cited

U.S. PATENT DOCUMENTS

| | | | |
|---|---|---|---|
| 2010/0207895 A1* | 8/2010 | Joung | G06F 3/016 345/173 |
| 2010/0225607 A1* | 9/2010 | Kim | G06F 3/042 345/173 |
| 2012/0028710 A1* | 2/2012 | Furukawa | G06F 21/32 463/37 |
| 2012/0127071 A1* | 5/2012 | Jitkoff | G06F 3/0481 345/156 |
| 2013/0069772 A1* | 3/2013 | Najafi | G08B 6/00 340/407.1 |
| 2013/0321317 A1* | 12/2013 | Hirukawa | G06F 3/016 345/173 |
| 2014/0085460 A1* | 3/2014 | Park | G06F 21/84 348/135 |

(Continued)

FOREIGN PATENT DOCUMENTS

EP    2226741 A1    9/2010

*Primary Examiner* — Sang H Kim
(74) *Attorney, Agent, or Firm* — Chip Law Group

(57) ABSTRACT

Various aspects of a system and a method for device authentication are disclosed herein. The method includes generating one or more vibrations in an electronic device in response to receiving a first user input. In response to the received first user input, a plurality of user interface (UI) objects are displayed. Each of the displayed plurality of UI objects is associated with a corresponding pre-configured number of vibrations. In response to the displayed plurality of UI objects, a second user input is received that enables selection of one or more of the displayed plurality of UI objects. An access to the electronic device is authenticated when the pre-configured number of vibrations associated with the received second user input matches the generated one or more vibrations.

24 Claims, 6 Drawing Sheets

(56) References Cited

U.S. PATENT DOCUMENTS

2014/0109219 A1* 4/2014 Rohrweck .............. G06F 21/36
 726/19
2015/0045000 A1* 2/2015 Kim ..................... G06F 3/0488
 455/411
2015/0264569 A1* 9/2015 Toyota ................. H04W 12/06
 726/7

* cited by examiner

METHOD AND SYSTEM FOR DEVICE AUTHENTICATION

FIELD

Various embodiments of the disclosure relate to device authentication. More specifically, various embodiments of the disclosure relate to authentication of a device via vibration-based feedback.

BACKGROUND

A touchscreen is an electronic visual display that a user can control through simple or multi-touch gestures by touching the screen with a special stylus/pen, and/or one or more fingers. Touchscreens are often used with haptic response systems. An example of this technology would be a system that caused the device to vibrate when a button on the touchscreen is tapped. Haptic technology (or haptics) is a tactile feedback technology, which takes advantage of the sense of touch by applying forces, vibrations, or motions to the user. Haptic devices may incorporate tactile sensors that measure forces exerted by the user on the interface.

With the advent of new-generation touchscreen consumer electronic (CE) devices, such as touch compatible CE devices, smartphones, handheld personal digital assistants, a need for a more secure way of device authentication has increased. However, the existing techniques of authentication to access the CE device may not always provide a desired level of security.

Further limitations and disadvantages of conventional and traditional approaches will become apparent to one of skill in the art, through comparison of described systems with some aspects of the present disclosure, as set forth in the remainder of the present application with reference to the drawings.

SUMMARY

A method and system are provided for device authentication substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
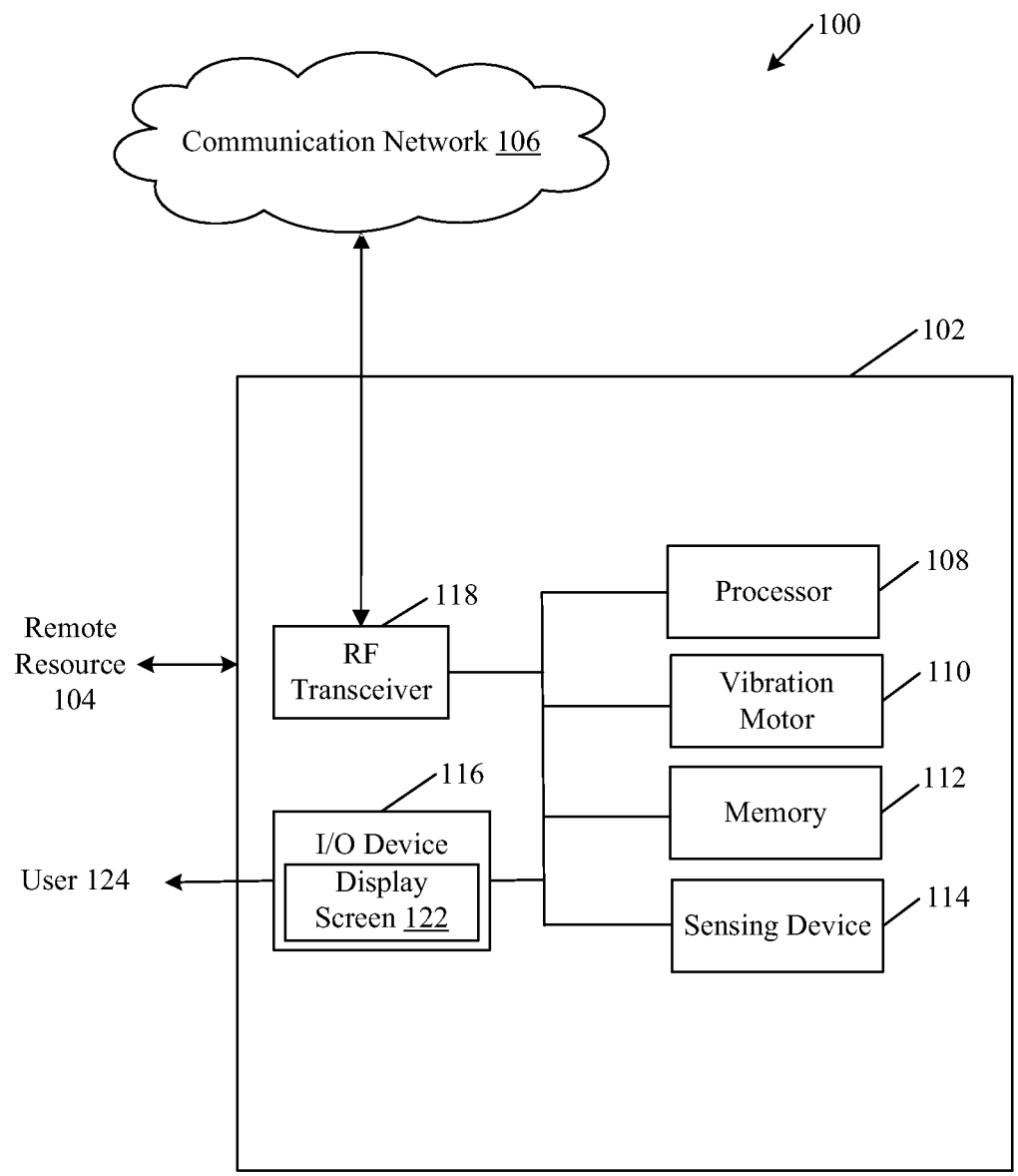
FIG. 1 is a block diagram of an exemplary device, in accordance with an embodiment of the disclosure.

The following described implementations may be found in a method and a system for device authentication. Exemplary aspects of the disclosure may comprise generation of one or more vibrations in response to a received first user input. In response to the received first user input, a plurality of user interface (UI) objects may be displayed. Each of the displayed plurality of UI objects may be associated with a corresponding pre-configured number of vibrations. In response to the displayed plurality of UI objects, a second user input may be received, which may enable a selection of one or more of the displayed plurality of UI objects. When the pre-configured number of vibrations associated with the received second user input matches the generated one or more vibrations, an access to the electronic device may be authenticated.

In an embodiment, each of the displayed plurality of UI objects may be associated with the corresponding pre-configured number of vibrations at a pre-configured frequency of vibration. In another embodiment, each of the displayed plurality of UI objects may be associated with the corresponding pre-configured number of vibrations at a pre-configured intensity of vibration. In another embodiment, each of the displayed plurality of UI objects may be associated with the corresponding pre-configured number of vibrations at a pre-configured direction of vibration.

In an embodiment, the first user input may comprise one of a press and hold operation of a hardware button or a software button, a single press of a hardware button or a software button of the electronic device, and/or the like.

In an embodiment, the second user input may comprise one of the selection of one or more of the displayed plurality of UI objects, or a release of the selection of the one or more of the displayed plurality of UI objects.

In an embodiment, the displayed plurality of UI objects may comprise one or more of an image, an icon, an alphanumeric text, and/or the like.

In an embodiment, the authentication of the access to the electronic device may comprise one or more of an operation to unlock the electronic device, an operation to access one or more applications installed in the electronic device, and/or the like.

In an embodiment, the plurality of UI objects may be re-displayed when the pre-configured number of vibrations associated with the received second user input does not match the generated one or more vibrations. In another embodiment, another plurality of UI objects may be displayed when the pre-configured number of vibrations associated with the received second user input does not match the generated one or more vibrations.

In accordance with another embodiment, a plurality of UI objects, associated with a corresponding pre-configured number of vibrations may be displayed. A first user input may be received. In an embodiment, the first user input may be a selection of one or more of the displayed plurality of UI objects. In response to the received first user input, a plurality of vibrations may be generated. In response to the generated plurality of vibrations, a second user input may be received after a time period. An access to the electronic device may be authenticated when a number of the plurality of vibrations in the first time period matches the pre-configured number of vibrations associated with the selected one or more displayed UI objects.

In such an embodiment, the second user input may comprise a tilt operation performed on the electronic device in a pre-configured direction.

FIG. 1 is a block diagram of an exemplary device, in accordance with an embodiment of the disclosure. Referring to FIG. 1, there is shown a block diagram 100 that comprises an electronic device 102, a remote resource 104, and a communication network 106. The electronic device 102 may comprise one or more processors, such as a processor 108, a vibration motor 110, a memory 112, a sensing device 114, and one or more Input/output devices, such as an I/O device 116. The electronic device 102 may further comprise a radio frequency (RF) transceiver 118, a graphical user interface (GUI) 120 (not shown in FIG. 1), and a display screen 122. The electronic device 102 may be associated with a user 124.

The electronic device 102 may comprise suitable logic, circuitry, interfaces, and/or code that may be operable to receive a plurality of UI objects, such as graphical icons, streamed by the remote resource 104. In an embodiment, the electronic device 102 may receive one or more instructions from the user 124, via the I/O device 116 (such as the display screen 122). In an embodiment, the electronic device 102 may be a haptic device, which comprises one or more tactile sensors to measure forces exerted by the user 124 on the GUI 120. The electronic device 102 may be configured to remotely communicate with a remote handheld device, via a wired connection or short-range communication.

The electronic device 102 may be communicatively coupled with the remote resource 104 via the communication network 106. The processor 108 in the electronic device 102 may be communicatively coupled to the vibration motor 110, the memory 112, the sensing device 114, and the I/O device 116. The processor 108 may communicate with the communication network 106, via the RF transceiver 118. The electronic device may be associated with the user 124, via the GUI shown on the display screen 122. Examples of the electronic device 102 may include, but are not limited to, a smartphone, a digital printer, a laptop, a tablet computer, a television, a video display, and/or a personal digital assistant (PDA) device.

The remote resource 104 may comprise suitable logic, circuitry, interfaces, and/or code that may be pre-configured to store data (hereinafter referred to as a/the set of pre-stored data). The set of pre-stored data may comprise alphanumeric and non-alphanumeric data. The non-alphanumeric data may comprise a plurality of images and a set of gestures, for example, hand gestures, finger gestures, facial gestures, and/or body gestures. The non-alphanumeric data may further comprise speech (or audio) input. In an embodiment, the remote resource 104 may be connected to the electronic device 102 via the RF transceiver 118. In another embodiment, the remote resource 104 may be integrated with the memory 112 of the electronic device 102. The remote resource 104 may be implemented using several technologies that are well known to those skilled in the art.

The communication network 106 may include a medium through which the electronic device 102 may communicate with the remote resource 104, and/or another electronic device (not shown). Examples of the communication network 106 may include, but are not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). Various devices in the block diagram 100 may be operable to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

The processor 108 may comprise suitable logic, circuitry, interfaces, and/or code that may be operable to execute a set of instructions stored in the memory 112. The processor 108 may be implemented based on a number of processor technologies known in the art. Examples of the processor 108 may be an X86-based processor, a Reduced Instruction Set Computing (RISC) processor, an Application-Specific Integrated Circuit (ASIC) processor, a Complex Instruction Set Computing (CISC) processor, and/or any other processor.

The vibration motor 110 may comprise suitable logic, circuitry, and/or interfaces that may be connected with an off-center weight. Such an off-center weight may generate a vibration feedback to notify the user 124 about an event. In an embodiment, the vibration motor 110 may be associated with one or more tactile sensors to generate the vibration feedback. Examples of implementation of the vibration motor 110 may include, but are not limited to, a cylindrical style eccentric rotating mass (ERM) vibration motor or a coin style ERM vibration motor.

The memory 112 may comprise suitable logic, circuitry, and/or interfaces that may be operable to store a machine code and/or a computer program having at least one code section executable by the processor 108. The memory 112 may further be operable to store pre-configured number of vibrations associated with one or more of a plurality of UI objects displayed on the display screen 122. The memory 112 may be further operable to store a pre-configured frequency, intensity and/or direction of vibration, associated with the pre-configured number of vibrations. The memory 112 may be further operable to store one or more passkeys (for the user 124 configured to operate as a system administrator), one or more user profiles (such as a user profile of the user 124), and/or any other data. Examples of implementation of the memory 112 may include, but are not limited to, Random Access Memory (RAM), Read Only Memory (ROM), Hard Disk Drive (HDD), and a Secure Digital (SD) card.

The sensing device 114 may comprise suitable logic, circuitry, and/or interfaces that may be operable to store a machine code and/or a computer program having at least one code section executable by the processor 108. The sensing device 114 may comprise one or more sensors to confirm a recognition, identification and/or verification of the user 124. The one or more sensors may comprise a camera to detect at least one of a fingerprint, palm geometry, a two- or three-dimensional facial profile, characteristic features of iris, and/or a retinal scan of the user 124. The one or more sensors may further include a thermal camera to capture thermal radiations (or thermograms) of the user 124, and a microphone to detect a voice pattern of the user 124. The one or more sensors may comprise capacitive touch sensors to detect one or more touch-based input received from the user 124, via the display screen 122. The one or more sensors may further comprise tactile sensors to measure forces exerted by the user 124 on the GUI 120.

The sensing device 114 may implement various known algorithms for user recognition, user identification and/or user verification. Examples of such algorithms include, but are not limited to, algorithms for tactile-rendering, face recognition, voice recognition, iris recognition, password matching, and/or fingerprint matching. It would be appreciated by those skilled in the art that any unique characteristic of the user may be accepted as a user input for identification purposes at least in the ongoing context.

The I/O device 116 may comprise suitable logic, circuitry, interfaces, and/or code that may be operable to receive an input or provide an output to the user 124. The I/O device 116 may comprise various input and output devices that may be operable to communicate with the processor 108. Examples of the input devices may include, but are not limited to, a keyboard, a mouse, a joystick, a touch screen, a microphone, a camera, a motion sensor, a light sensor, and/or a docking station. Examples of the output devices may include, but are not limited to, the display screen 122, and/or a speaker.

The RF transceiver 118 may comprise suitable logic, circuitry, interfaces, and/or code that may be operable to communicate with the remote resource 104, via the communication network 106. The RF transceiver 118 may implement known technologies to support wired or wireless communication of the electronic device 102 with the communication network 106. The RF transceiver 118 may include, but is not limited to, an antenna, one or more amplifiers, a tuner, one or more oscillators, a digital signal processor, a coder-decoder (CODEC) chipset, a subscriber identity module (SIM) card, and/or a local buffer. The RF transceiver 118 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The GUI 120 may be shown on the display screen 122 to allow the user 124 to interact with the electronic device 102 through a plurality of user interface (UI) objects, shown on the display screen 122. The plurality of UI objects may comprise graphical icons, alphanumeric text, visual indicators (such as secondary notation), and/or the like. In an embodiment, the GUI 120 may be operable to measure forces exerted by the user 124 on one or more of the plurality of UI objects, via tactile sensors. An action in the GUI 120 may be performed through direct manipulation of the plurality of UI objects, shown on the display screen 122.

The display screen 122 may comprise suitable logic, circuitry, interfaces, and/or code that may be operable to display the plurality of UI objects to the user 124. The display screen 122 may be further operable to display one or more features and/or applications of the electronic device 102 to the user 124. The display screen 122 may be further operable to receive an input from the user 124, via a touch-sensitive screen. Such an input may be received from the user 124 via a virtual keypad, a stylus, a touch-based input, and/or a gesture. The display screen 122 may be realized through several known technologies such as, but not limited to, Liquid Crystal Display (LCD) display, Light Emitting Diode (LED) display, Organic LED (OLED) display technology, and/or the like.

The user 124 may operate the electronic device 102 as a system administrator. In an embodiment, the user 124 may be an owner of the electronic device 102. The user 124 may configure a personal computing environment that includes the electronic device 102.

In operation, as an optional step, the sensing device 114 in the electronic device 102 may be configured to perform a preliminary authentication, for example, face recognition of the user 124. In an embodiment, the user 124 may not be authenticated, based on an unsuccessful match of the preliminary authentication.

In another embodiment the user 124 may be authenticated, based on a successful match of the preliminary authentication. Consequently, the processor 108 may receive a first user input from the user 124 associated with the electronic device 102.

In an embodiment, the first user input may be a press and hold operation or a single press of a hardware button of the electronic device 102. In another embodiment, the first user input may be a press and hold operation or a single press of a software button displayed on the GUI 120, shown on the display screen 122. In an embodiment, the first user input may be a press and hold operation on a pre-configured UI object shown on the display screen 122. In such an embodiment, the plurality of UI objects may be one or more of an image, an icon and/or an alphanumeric text. In an embodiment, the first user input may be a selection of one or more UI objects from a plurality of UI objects displayed on the GUI 120. In an embodiment, the first user input may be a touch-based input provided by the user 124, via the GUI 120. The first user input may be provided via a hardware button on the electronic device 102 or by a point-and-click device, such as an electronic mouse.

The processor 108, in response to receiving the first user input, may access the memory 112 to determine a pattern of vibration feedback. In another embodiment, the processor 108 may access the remote resource 104, via the RF transceiver 118, and the communication network 106, to determine the pattern of vibration feedback. In an embodiment, the pattern of vibration feedback may comprise one or more vibrations. In another embodiment, the pattern of vibration feedback may comprise multiple sets of vibrations. In an embodiment, the pattern of vibration feedback is associated with the first user input. Such an association may be stored in the memory 112 and/or the remote resource 104.

Based on the determination of the pattern of the vibration feedback, the processor 108 may transmit an instruction to the vibration motor 110. In response to the received instruction, the vibration motor 110 may generate one or more vibrations that correspond to the determined pattern of vibration feedback. In an embodiment, the vibration motor 110 may generate multiple sets of vibrations.

In response to the generated one or more vibrations, the processor 108 may display a plurality of UI objects on the GUI 120. Each of the displayed plurality of UI objects may be associated with a corresponding pre-configured number of vibrations. Such an association between each of the displayed plurality of UI objects and the corresponding pre-configured number of vibrations may be stored in the memory 112 and/or the remote resource 104.

The processor 108 may be further operable to receive a second user input from the user 124. In an embodiment, the second user input may be a release of the press and hold operation or a single press of a hardware button of the electronic device 102. In an embodiment, the second user input may be a release of the press and hold operation or another single press of a software button displayed on the GUI 120, shown on the display screen 122. In an embodiment, the second user input may be a release of the press and hold operation on a pre-configured UI object shown on the display screen 122. In an embodiment, the second user input may be a de-selection of the selected one or more UI objects from a plurality of UI objects displayed on the GUI 120. In an embodiment, where the multiple sets of vibrations are generated, the user 124 may provide second user input that corresponds to each of the multiple sets of vibrations.

In an embodiment, the processor 108 may determine a first set of characteristics of the one or more vibrations generated in response to the received first user input. The first set of characteristics may include, but are not limited to, a first number of the one or more vibrations, a first frequency of the one or more vibrations, a first intensity of the one or more vibrations, and/or a first direction of the one or more vibrations.

The processor 108 may further determine a second set of characteristics of the pre-configured number of vibrations associated with the received second user input. The second set of characteristics may include, but are not limited to, a second number of the one or more vibrations, a second frequency of the one or more vibrations, a second intensity of the one or more vibrations, and/or a second direction of the one or more vibrations.

In instances where the first set of characteristics of the one or more vibrations does not match with the respective second set of characteristics of the pre-configured number of vibrations, the user 124 is not authenticated to access one or more functionalities and/or applications of the electronic device 102. Thus, the user 124 is denied access to execute the one or more functionalities and/or applications of the electronic device 102. In an embodiment, the plurality of UI objects may be displayed again to receive another second input from the user 124. In another embodiment, another plurality of UI objects may be displayed to receive another second input from the user 124.

In instances where the first set of characteristics of the one or more vibrations successfully matches with the respective second set of characteristics of the pre-configured number of vibrations, the user 124 is authenticated to access the one or more functionalities and/or applications of the electronic device 102. Thus, the user 124 may perform the one or more functionalities on the electronic device 102. Examples of the one or more functionalities may include, but are not limited to an operation to unlock the electronic device 102, and/or an operation to access one or more applications installed in the electronic device 102.

In accordance with another embodiment, the processor 108 may display a plurality of UI objects on the GUI 120. Each of the displayed plurality of UI objects may be associated with a corresponding pre-configured number of vibrations. Such an association between each of the displayed plurality of UI objects and the corresponding pre-configured number of vibrations may be stored in the memory 112 and/or the remote resource 104.

The processor 108 may receive a first user input from the user 124 associated with the electronic device 102. The processor 108, in response to the received first user input, may access the memory 112 and/or the remote resource 104 to determine a pattern of vibration feedback. In an embodiment, the pattern of vibration feedback may be associated with the first user input. Such an association may be stored in the memory 112 and/or the remote resource 104.

Based on the determination of the pattern of the vibration feedback, the processor 108 may transmit an instruction to the vibration motor 110. In response to the received instruction, the vibration motor 110 may generate a plurality of vibrations that correspond to the determined pattern of the vibration feedback.

In response to the plurality of vibrations, the processor 108 may be operable to receive a second user input from the user 124. Such a second user input may be received from the user 124 after a time period. In an embodiment, the second user input may be a tilt operation in a predetermined direction, performed on the electronic device 102 by the user 124. The tilt operation may be performed in combination with the first user input after the time period.

In an embodiment, the processor 108 may determine a first set of characteristics of the one or more vibrations generated in a first time period, in response to the received first user input. The first set of characteristics may include, but are not limited to, a first number of the one or more vibrations, a first frequency of the one or more vibrations, a first intensity of the one or more vibrations, and/or a first direction of the one or more vibrations.

The processor 108 may further determine a second set of characteristics of the pre-configured number of vibrations associated with the received second user input. The second set of characteristics may include, but are not limited to, a second number of the one or more vibrations, a second frequency of the one or more vibrations, a second intensity of the one or more vibrations, and/or a second direction of the one or more vibrations. The second set of characteristics may further include a tilt angle and/or a tilt direction associated with the second user input, such as the tilt operation.

In instances where the first set of characteristics of the one or more vibrations does not match with respective second set of characteristics of the pre-configured number of vibrations, the user 124 is denied access to execute the one or more functionalities and/or applications of the electronic device 102.

In instances where the first set of characteristics of the one or more vibrations successfully matches with respective second set of characteristics of the pre-configured number of vibrations, the processor 108 may further confirm the tilt angle and or tilt direction with the pre-configured tilt angle and/or tilt direction stored in the memory 112 and/or the remote resource 104. Based on the successful match and successful confirmation, the user 124 may be authenticated to access the one or more functionalities and/or applications of the electronic device 102.

Figure 2:
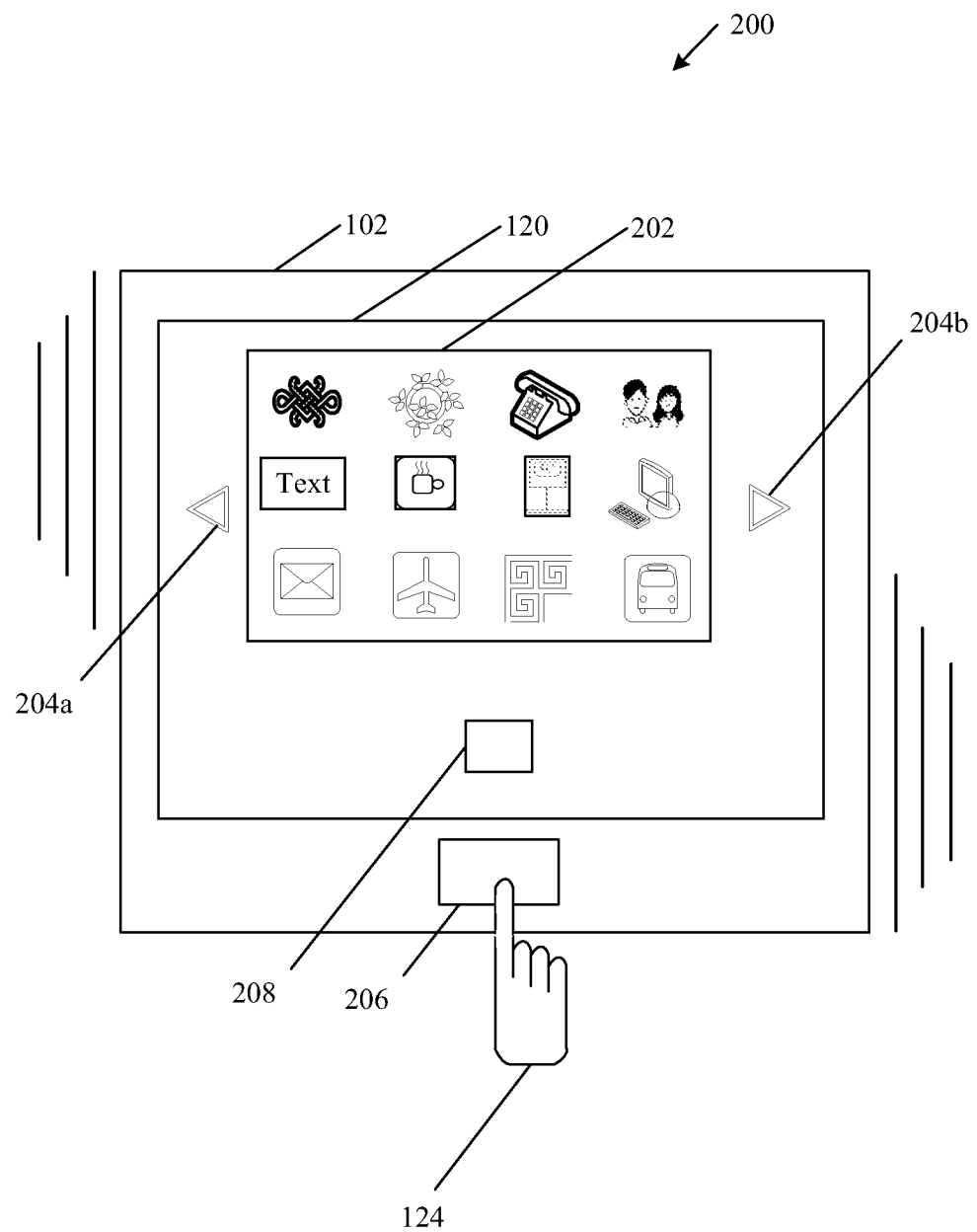
FIG. 2 illustrates a first exemplary scenario for implementing the disclosed system and method, in accordance with an embodiment of the disclosure.

FIG. 2 is a diagram 200 illustrating an exemplary scenario for authentication, in accordance with an embodiment of the disclosure. The diagram 200 of FIG. 2 is described in conjunction with the block diagram of FIG. 1. The diagram 200 comprises a plurality of UI objects 202, two scrollable arrows 204a and 204b, a hardware button 206, and a software button 208. Notwithstanding, the disclosure may not be so limited, and other implementations with or without a hardware button and/or a software button may be implemented without limiting the scope of the disclosure.

With reference to FIG. 2, there is shown an exemplary graphical user interface (GUI) 120 on the display screen of the electronic device 102. The hardware button 206 may be located on the electronic device 102. The software button 208 may be a dedicated software button displayed in the GUI 120. In an embodiment, the software button 208 may be one of the plurality of UI objects 202 displayed on the GUI 120.

The GUI 120 may include the plurality of UI objects 202 displayed on the display screen. The plurality of UI objects 202 may be generic images connected to the electronic device 102. The plurality of UI objects 202 may include a plurality of personalized images uploaded by the user 124. The plurality of UI objects 202 may further include a customized alphanumeric text specified by the user 124. The plurality of UI objects 202 may be displayed to the user 124 in a pre-configured format. The pre-configured format may include a matrix format (rows and columns), a tile format with scroll bars as arrows, a scrollable row and a scrollable column, and/or the like. In an exemplary scenario, a matrix format with two scrollable arrows 204a and 204b is used to display the plurality of UI objects 202.

As the first user input, the user 124 may provide a press and hold operation on either the hardware button 206 located on the electronic device 102 or the software button 208 displayed in the GUI 120.

The processor 108, in response to the first user input, may access the memory 112 to determine a pattern of vibration feedback, such as a count of three vibrations, or three sets with a count of three-two-three vibrations, for example. Based on the determination of the pattern of vibration feedback, the processor 108 may transmit an instruction to the vibration motor 110 to generate the count of three vibrations, or the three sets with the count of three-two-three vibrations. Notwithstanding, the disclosure may not be so limited and any combination of sets of vibrations may be included without limiting the scope of the disclosure.

The processor 108 may determine a first set of characteristics of the pattern of the vibration feedback, such as a count of three vibrations, or the three sets with the count of three-two-three vibrations, generated in response to the received first user input. Examples of the first set of characteristics may include, but are not limited to, a first number of the one or more vibrations, a first frequency of the one or more vibrations, a first intensity of the one or more vibrations, and/or a first direction of the one or more vibrations. In an embodiment, in response to the generated vibration feedback, the processor 108 may display a plurality of UI objects on the GUI 120. In another embodiment, the processor 108 may display a plurality of UI objects on the GUI 120, before the generation of vibration feedback. Each of the displayed plurality of UI objects may be associated with a corresponding pre-configured number of vibrations.

The processor 108 may be further operable to receive a second user input from the user 124. In an embodiment, the second user input may include a release of the press and hold operation on either the hardware button 206 or the software button 208. In instances where the three sets of vibrations are generated, the user 124 may provide selection of three UI objects from the displayed plurality of UI objects as the second user input. Each selection of the three UI objects may correspond to each of the three sets of vibrations.

The processor 108 may further determine a second set of characteristics of the pre-configured number of vibrations associated with the received second user input. Examples of the second set of characteristics may include, but are not limited to, a second number of the one or more vibrations, a second frequency of the one or more vibrations, a second intensity of the one or more vibrations, and/or a second direction of the one or more vibrations.

In instances where the first set of characteristics of the one or more vibrations does not match with the respective second set of characteristics of the pre-configured number of vibrations, the user 124 is not authenticated to access one or more functionalities and/or applications of the electronic device 102. In such an instance, the plurality of UI objects 202 may be displayed again to receive another second user input from the user 124.

In instances where the first set of characteristics of the one or more vibrations successfully matches with the respective second set of characteristics of the pre-configured number of vibrations, the user 124 is authenticated to access the one or more functionalities and/or applications of the electronic device 102.

Figure 3:
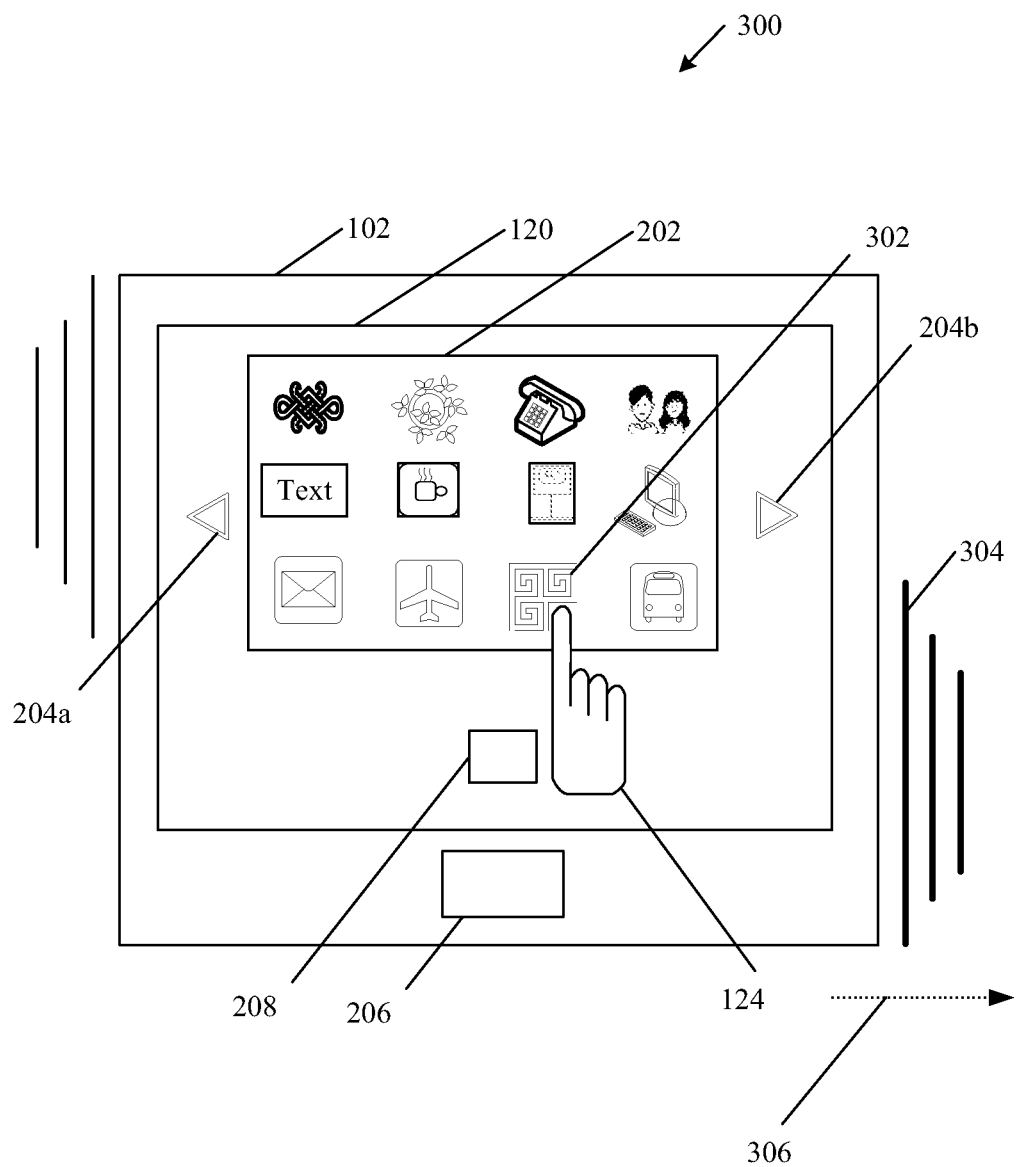
FIG. 3 illustrates a second exemplary scenario for implementing the disclosed system and method, in accordance with an embodiment of the disclosure.

FIG. 3 is a diagram 300 illustrating another exemplary scenario for implementing the disclosed system and method, in accordance with an embodiment of the disclosure. The diagram 300 of FIG. 3 is described in conjunction with FIGS. 1-2. With reference to FIG. 3, there is shown a UI object 302. The UI object is one of the plurality of UI objects 202 that have already been described in detail with respect to FIG. 2.

With reference to FIG. 3, the user 124 may provide a selection of the hardware button 206 for a pre-specified time period, such as 3 seconds. The processor 108, in response to the first user input, may access the memory 112 to determine a pattern of vibration feedback.

Based on the determination of the pattern of the vibration feedback, the processor 108 may transmit an instruction to the vibration motor 110. In response to the received instruction, the vibration motor 110 may generate one or more vibrations that correspond to the determined pattern of the vibration feedback.

In an embodiment, in response to the generated vibration feedback, the processor 108 may display a plurality of UI objects on the GUI 120. In another embodiment, the processor 108 may display a plurality of UI objects on the GUI 120, before the generation of vibration feedback. Each of the displayed plurality of UI objects may be associated with a corresponding pre-configured number of vibrations.

The processor 108 may be further operable to receive a second user input, such as a selection of the UI object 302, from the user 124.

The processor 108 may determine a first set of characteristics of the one or more vibrations, such as a count of three high-intensity vibrations 304 towards the right direction 306, generated in response to the received first user input.

The processor 108 may further determine a second set of characteristics of the pre-configured number of vibrations associated with the selection of the UI object 302.

In instances where the first set of characteristics of the one or more vibrations does not match with respective second set of characteristics of the pre-configured number of vibrations, the user 124 is not authenticated to access one or more functionalities and/or applications of the electronic device 102. Thus, the user 124 is denied access to execute the one or more functionalities and/or applications of the electronic device 102. In an embodiment, the plurality of UI objects may be displayed again to receive another second input from the user 124. In another embodiment, another plurality of UI objects may be displayed to receive another second input from the user 124.

In instance where the first set of characteristics of the one or more vibrations successfully matches with respective second set of characteristics of the pre-configured number of vibrations, the user 124 is authenticated to access the one or more functionalities and/or applications of the electronic device 102.

Figure 4:
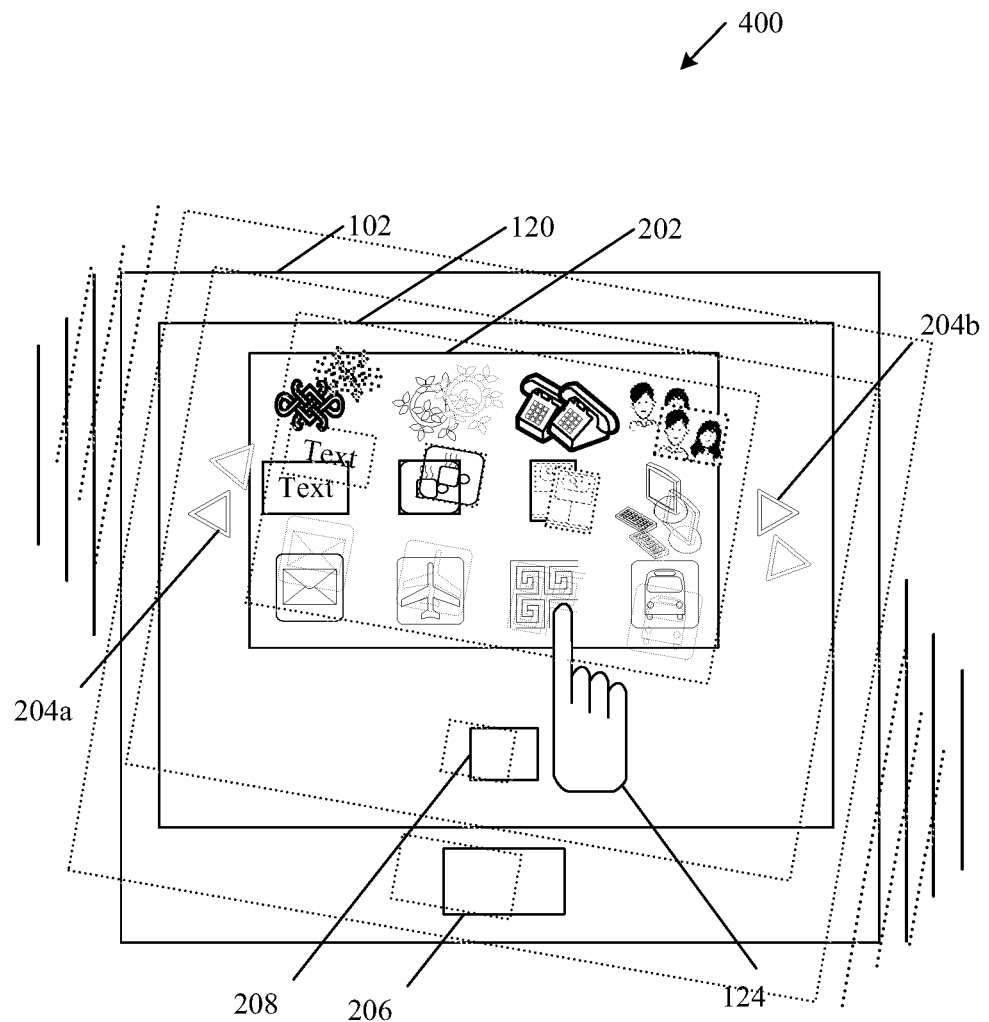
FIG. 4 illustrates a third exemplary scenario for implementing the disclosed system and method, in accordance with an embodiment of the disclosure.

FIG. 4 is a diagram 400 illustrating another exemplary scenario for implementing the disclosed system and method, in accordance with an embodiment of the disclosure. The diagram 400 of FIG. 4 is described in conjunction with FIGS. 1-3.

With reference to FIG. 4, the processor 108 may display a plurality of UI objects 202 on the GUI 120. Each of the displayed plurality of UI objects may be associated with a corresponding pre-configured number of vibrations.

The processor 108 may receive a first user input, such as a selection of the UI object 302, from the user 124.

The processor 108, in response to the received first user input, may access the memory 112 and/or the remote resource 104 to determine a pattern of vibration feedback. The pattern of vibration feedback may be associated with the first user input. Such an association may be stored in the memory 112 and/or the remote resource 104.

Based on the determination of the pattern of vibration feedback, the processor 108 may transmit an instruction to the vibration motor 110. In response to the received instruction, the vibration motor 110 may generate a plurality of vibrations that correspond to the determined pattern of vibration feedback.

In response to the plurality of vibrations, the processor 108 may be operable to receive a second user input from the user 124. Such a second user input may be received from the user 124 after a time period, such as 5 seconds. The second user input may be a tilt operation towards the left direction (shown as dashed boundary lines) performed on the electronic device 102 by the user 124.

The processor 108 may determine a first set of characteristics of the one or more vibrations generated in 5 seconds, for example, in response to the received first user input.

The processor 108 may further determine a second set of characteristics of the pre-configured number of vibrations associated with the received second user input. The second set of characteristics may include, but are not limited to, a second number of the one or more vibrations, a second frequency of the one or more vibrations, a second intensity of the one or more vibrations, and/or a second direction of the one or more vibrations. The second set of characteristics may further include a tilt angle of 30 degrees, for example, and/or a tilt direction towards the left side, for example, associated with the tilt operation.

In instances where the first set of characteristics of the one or more vibrations does not match with respective second set of characteristics of the pre-configured number of vibrations, the user 124 is not authenticated to access one or more functionalities and/or applications of the electronic device 102. Thus, the user 124 is denied access to execute the one or more functionalities and/or applications of the electronic device 102.

In instances where the first set of characteristics of the one or more vibrations successfully matches with respective second set of characteristics of the pre-configured number of vibrations, the processor 108 may confirm the tilt angle and/or tilt direction with the pre-configured tilt angle and/or tilt direction stored in the memory 112 and/or the remote resource 104. Based on the successful match and successful confirmation, the user 124 may be authenticated to access the one or more functionalities and/or applications of the electronic device 102.

Figure 5:
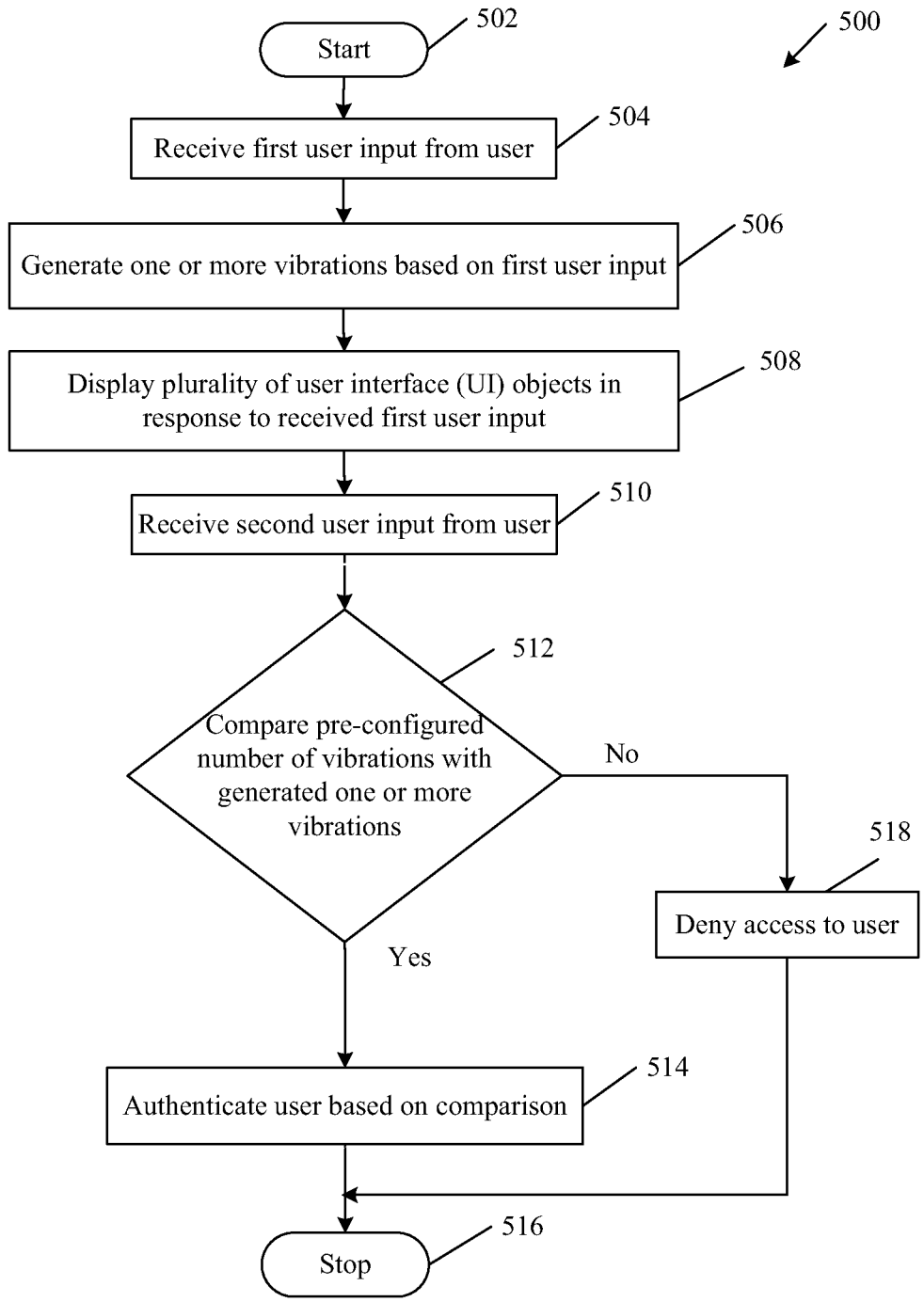
FIG. 5 is a flow chart illustrating exemplary steps for device authentication, in accordance with an embodiment of the disclosure.

FIG. 5 is a flow chart illustrating exemplary steps for device authentication, in accordance with an embodiment of the disclosure. With reference to FIG. 5, there is shown a flow chart 500. The flow chart 500 is described in conjunction with FIGS. 1-4. The method starts at step 502 and proceeds to step 504.

At step 504, a first user input may be received from the user 124 associated with the electronic device 102.

At step 506, in response to the first user input, an instruction to the vibration motor 110 may be communicated to generate one or more vibrations.

At step 508, a plurality of UI objects may be displayed in response to the received first user input. Each of the displayed plurality of UI objects may be associated with a corresponding pre-configured number of vibrations.

At step 510, a second user input may be received that enables selection of one or more of the displayed plurality of UI objects.

At step 512, it may be determined whether the pre-configured number of vibrations associated with the received second user input matches with the generated one or more vibrations. In instances where the pre-configured number of vibrations associated with the received second user input successfully matches with the generated one or more vibrations, control passes to step 514.

At step 514, the user 124 is authenticated to access one or more functionalities and/or applications of the electronic device 102. Control passes to end step 516.

In instances where the pre-configured number of vibrations associated with the received second user input does not match with the generated one or more vibrations, control passes to step 518. At step 518, the user 124 is not authenticated to access the functionalities and/or applications of the electronic device 102. Control passes to end step 516.

Figure 6:
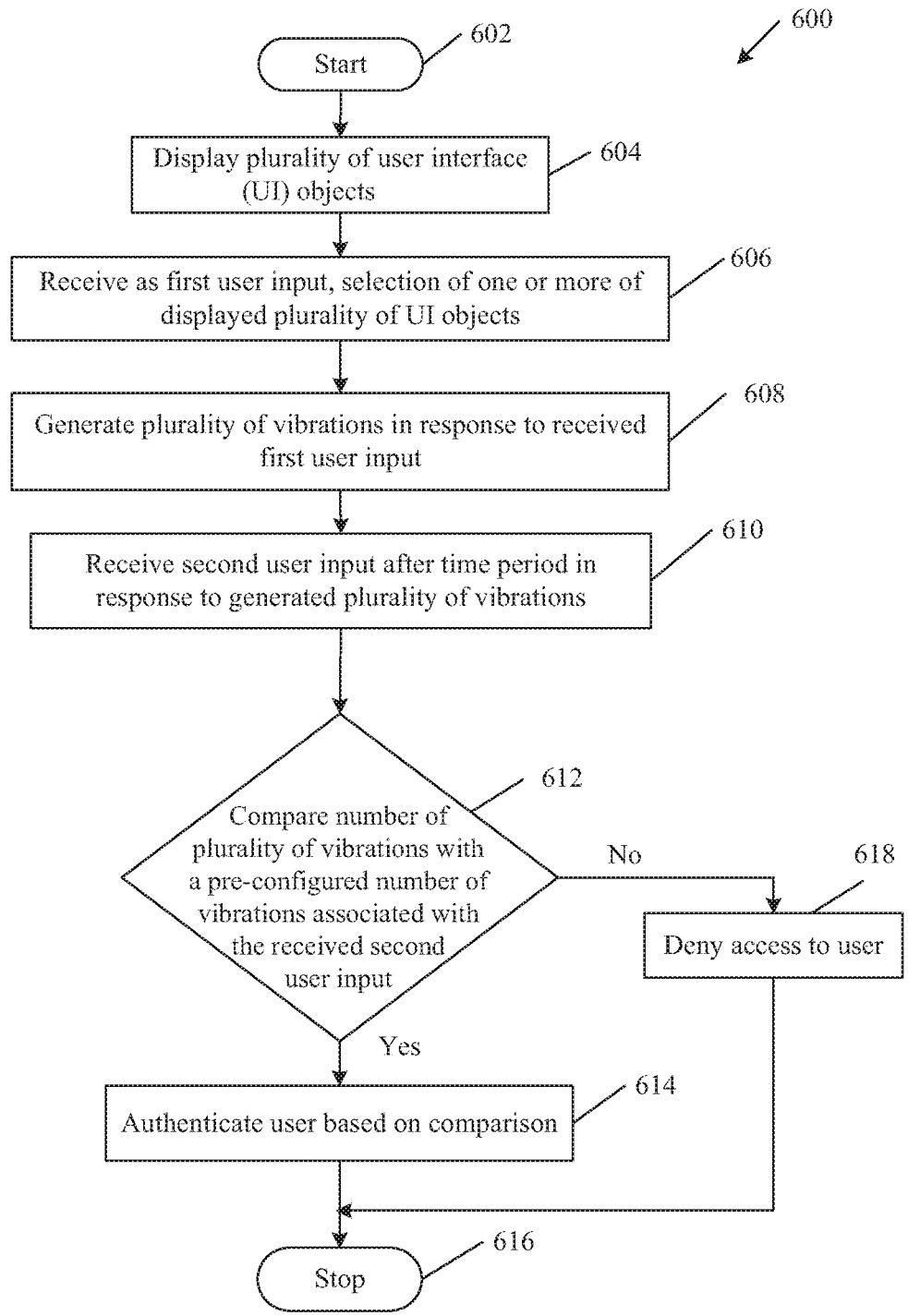
FIG. 6 is another flow chart illustrating exemplary steps for device authentication, in accordance with an embodiment of the disclosure.

FIG. 6 is another flow chart illustrating exemplary steps for device authentication, in accordance with an embodiment of the disclosure. With reference to FIG. 6, there is shown a flow chart 600. The flow chart 600 is described in conjunction with the block diagram of FIGS. 1-4. The method starts at step 602 and proceeds to step 604. At step 604, a plurality of UI objects may be displayed. Each of the displayed plurality of UI objects may be associated with a corresponding pre-configured number of vibrations.

At step 606, a selection of one or more of the displayed plurality of UI objects may be received from the user 124, as a first user input. Each of the displayed plurality of UI objects may be associated with a corresponding pre-configured number of vibrations.

At step 608, a plurality of vibrations, in response to the received first user input, may be generated by the vibration motor.

At step 610, a second user input may be received after a time period in response to the generated plurality of vibrations.

At step 612, the number of the plurality of vibrations in the time period, may be compared with the pre-configured number of vibrations, associated with the received second user input. In instances where the number of the plurality of vibrations in the time period successfully matches with the pre-configured number of vibrations associated with the received second user input, control passes to step 614.

At step 614, the user 124 is authenticated to access one or more functionalities and/or applications of the electronic device 102. Control passes to end step 616.

In instances where the number of the plurality of vibrations in the time period does not match with the pre-configured number of vibrations associated with the received second user input, control passes to step 618. At step 618, the user 124 is not authenticated, and denied access to the functionalities and/or applications of the electronic device 102. Control passes to end step 616.

In accordance with an embodiment of the disclosure, a system for authentication of the electronic device 102 is disclosed. The electronic device 102 comprises one or more processors (hereinafter referred to as the processor 108), the processor 108 being operable to generate one or more vibrations in response to a received first user input. In response to the received first user input, a first set of UI objects may also be displayed. Each of the displayed first set of UI objects may be associated with a corresponding pre-configured number of vibrations. In response to the displayed first set of UI objects, a second user input may be received that enables a selection of one or more of the displayed plurality of UI objects. When the pre-configured number of vibrations associated with the received second user input matches with the generated one or more vibrations, an access to the electronic device 102 may be authenticated.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for device authentication. The at least one code section in an electronic device 102, associated with a user 124, may cause the machine and/or computer to perform the steps comprising generating one or more vibrations in response to a received first user input. In response to the received first user input, a plurality of UI objects may also be displayed. Each of the displayed plurality of UI objects may be associated with a corresponding pre-configured number of vibrations. In response to the displayed plurality of UI objects, a second user input may be received that enables a selection of one or more of the displayed plurality of UI objects. When the pre-configured number of vibrations associated with the received the second user input matches with the generated one or more vibrations, an access to the electronic device 102 may be authenticated.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that may include a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for device authentication, said method comprising:
in an electronic device:
receiving a first user input;
generating a first number of vibrations based on said first user input;
determining a first set of characteristics of said first number of vibrations,
wherein said first set of characteristics of said first number of vibrations comprises one of a first intensity of vibration of said first number of vibrations, a first frequency of vibration of said first number of vibrations or a first direction of vibration of said first number of vibrations;
displaying a first plurality of user interface (UI) objects based on said first user input, wherein each UI object of said first plurality of UI objects is associated with said first number of vibrations;
receiving a second user input that corresponds to one of selection or release of at least a first UI object of said first plurality of UI objects;
determining a second set of characteristics of a second number of vibrations,
wherein said second set of characteristics of said second number of vibrations comprises one of a second intensity of vibration of said second number of vibrations, a second frequency of vibration of said second number of vibrations or a second direction of vibration of said second number of vibrations, and
wherein said second number of vibrations are associated with said second user input; and
authenticating access to said electronic device based on a first match between each of said determined first set of characteristics with a respective characteristic of said determined second set of characteristics.

2. The method according to claim 1, wherein each of said first plurality of UI objects is associated with said first number of vibrations at a specific frequency of vibration.

3. The method according to claim 1, wherein each of said first plurality of UI objects is associated with said first number of vibrations at a specific intensity of vibration.

4. The method according to claim 1, wherein each of said first plurality of UI objects is associated with said first number of vibrations in a specific direction of vibration.

5. The method according to claim 1, wherein said first user input comprises one of a first press and hold operation of a hardware button of said electronic device, a second press and hold operation of a software button of said electronic device, a first single press operation of said hardware button, or a second single press operation of said software button.

6. The method according to claim 1, wherein each of said first plurality of UI objects comprises at least one of an image, an icon or an alphanumeric text.

7. The method according to claim 1, wherein said authentication of said electronic device comprises at least one of a first operation associated with unlock of said electronic device or a second operation associated with access of at least one application installed in said electronic device.

8. The method according to claim 1, further comprising displaying said first plurality of UI objects based on a mismatch between said determined first set of characteristics and said determined second set of characteristics.

9. The method according to claim 1, further comprising displaying a second plurality of UI objects based on a mismatch between said determined first set of characteristics and said determined second set of characteristics.

10. The method according to claim 1, further comprising authenticating access to said electronic device based on:
   a second match between said first intensity of vibration of said first number of vibrations and said second intensity of vibration of said second number of vibrations;
   a third match between said first frequency of vibration of said first number of vibrations and said second frequency of vibration of said second number of vibrations; and
   a fourth match between said first direction of vibration of said first number of vibrations and said second direction of vibration of said second number of vibrations.

11. A method for authentication, said method comprising:
   in an electronic device:
      displaying a plurality of user interface (UI) objects, wherein each UI object of said plurality of UI objects is associated with a first number of vibrations;
      receiving a first user input that corresponds to one of selection or release of at least a first UI object of said plurality of UI objects;
      generating a second number of vibrations in a first time period based on said first user input;
      determining a first set of characteristics of said second number of vibrations in said first time period,
         wherein said first set of characteristics of said second number of vibrations comprises one of a first intensity of vibration of said second number of vibrations, a first frequency of vibration of said second number of vibrations or a first direction of vibration of said second number of vibrations;
      receiving a second user input after said first time period;
      determining a second set of characteristics of said first number of vibrations,
         wherein said second set of characteristics of said first number of vibrations comprises one of a second intensity of vibration of said first number of vibrations, a second frequency of vibration of said first number of vibrations or a second direction of vibration of said first number of vibrations, and
         wherein said first number of vibrations are associated with said reception of said second user input; and
      authenticating access to said electronic device based on a match between each of said determined first set of characteristics with a respective characteristic of said determined second set of characteristics.

12. The method according to claim 11, wherein said plurality of UI objects comprises at least one of an image, an icon or an alphanumeric text.

13. The method according to claim 11, wherein said authentication of said electronic device comprises at least one of a first operation associated with unlock of said electronic device or a second operation associated with access of at least one application installed in said electronic device.

14. The method according to claim 11, wherein said first user input comprises one of a first press and hold operation of a hardware button of said electronic device, a second press and hold operation of a software button of said electronic device, a first single press operation of said hardware button, or a second single press operation of said software button.

15. The method according to claim 11, wherein said second user input is a tilt operation on said electronic device in a specific direction.

16. A device, comprising:
   circuitry configured to:
      receive a first user input;
      generate a first number of vibrations based on said first user input;
      determine a first set of characteristics of said first number of vibrations,
         wherein said first set of characteristics of said first number of vibrations comprises one of a first intensity of vibration of said first number of vibrations, a first frequency of vibration of said first number of vibrations or a first direction of vibration of said first number of vibrations;
      display a first set of user interface (UI) objects based on said first user input, wherein each UI object of said first set of UI objects is associated with said first number of vibrations;
      receive a second user input that corresponds to one of selection or release of at least a first UI object of said first set of UI objects;
      determine a second set of characteristics of a second number of vibrations,
         wherein said second set of characteristics of said second number of vibrations comprises one of a second intensity of vibration of said second number of vibrations, a second frequency of vibration of said second number of vibrations or a second direction of vibration of said second number of vibrations, and
         wherein said second number of vibrations are associated with said second user input; and
      authenticate access to said device based on a match between each of said determined first set of characteristics with a respective characteristic of said determined second set of characteristics.

17. The device according to claim 16, wherein each of said first set of UI objects is associated with said first number of vibrations at a specific frequency of vibration.

18. The device according to claim 16, wherein each of said first set of UI objects is associated with said first number of vibrations at a specific intensity of vibration.

19. The device according to claim 16, wherein each of said first set of UI objects is associated with said first number of vibrations in a specific direction of vibration.

20. The device according to claim 16, wherein said first user input comprises one of a first press and hold operation of a hardware button of said device, a second press and hold operation of a software button of said device, a first single press operation of said hardware button, or a second single press operation of said software button.

21. The device according to claim 16, wherein said circuitry is further configured to display said first set of UI objects based on a mismatch between determined first set of characteristics and said determined second set of characteristics.

22. The device according to claim 16, wherein said circuitry is further configured to display a second set of UI objects based on a mismatch between determined first set of characteristics and said determined second set of characteristics.

23. A device, comprising:
  circuitry configured to:
    display a set of user interface (UI) objects, wherein each UI object of said set of UI objects is associated with a first number of vibrations;
    receive a first user input that corresponds to one of selection or release of at least a first UI object of said set of UI objects;
    generate a second number of vibrations in a first time period based on said first user input;
    determine a first set of characteristics of said second number of vibrations in said first time period,
    wherein said first set of characteristics of said second number of vibrations comprises one of a first intensity of vibration of said second number of vibrations, a first frequency of vibration of said second number of vibrations or a first direction of vibration of said second number of vibrations;
    receive a second user input after said first time period;
    determine a second set of characteristics of said first number of vibrations,
    wherein said second set of characteristics of said first number of vibrations comprises one of a second intensity of vibration of said first number of vibrations, a second frequency of vibration of said first number of vibrations or a second direction of vibration of said first number of vibrations, and
    wherein said first number of vibrations are associated with said reception of said second user input; and
    authenticate access to said device based on a match between each of said determined first set of characteristics with a respective characteristic of said determined second set of characteristics.

24. The device according to claim 23, wherein said second user input is a tilt operation on said device in a specific direction.

* * * * *